(No Model.)

C. H. ALLEN.
BICYCLE BELL.

No. 584,764. Patented June 22, 1897.

Witnesses:
Thomas Durant
Wallace Murdock

Inventor,
Charles H. Allen,
by
Church & Church
his atty's.

United States Patent Office.

CHARLES H. ALLEN, OF ROCHESTER, NEW YORK, ASSIGNOR OF ONE-HALF TO CARRIE J. SMYTH, OF SAME PLACE.

BICYCLE-BELL.

SPECIFICATION forming part of Letters Patent No. 584,764, dated June 22, 1897.

Application filed July 28, 1896. Serial No. 600,780. (No model.)

*To all whom it may concern:*

Be it known that I, CHARLES H. ALLEN, of Rochester, in the county of Monroe and State of New York, have invented certain new and useful Improvements in Bicycle-Bells; and I do hereby declare the following to be a full, clear, and exact description of the same, reference being had to the accompanying drawings, forming a part of this specification, and to the reference-numerals marked thereon.

My present invention has for its object to provide an improved bell or alarm adapted for use on bicycles or similar vehicles and to be operated by the rotation of the wheel; and it consists in certain improvements and combinations of parts, all as will be hereinafter fully described, and the novel features pointed out in the claims at the end of this specification.

Figure 1:
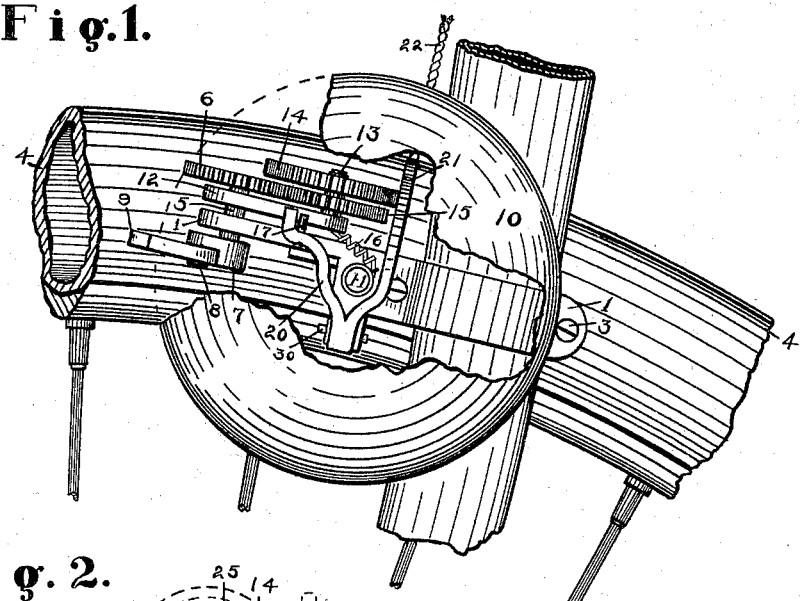
Figure 2:
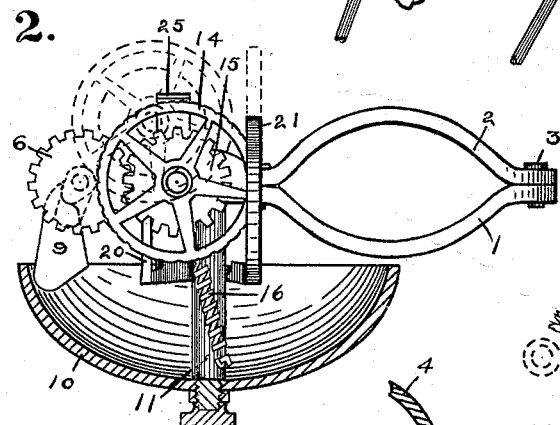
Figure 3:
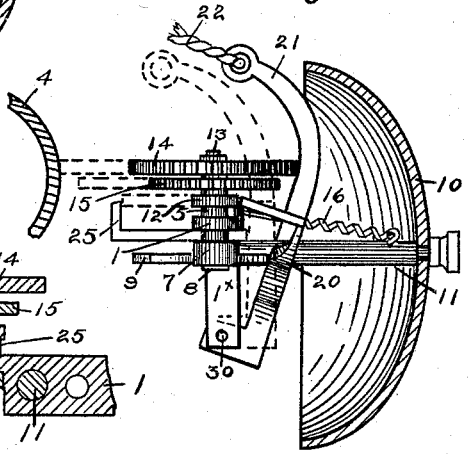
Figure 4:
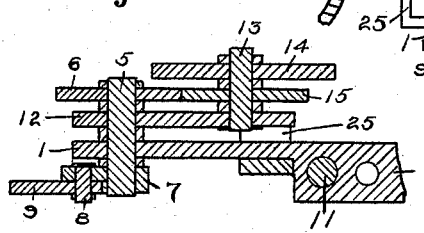

In the drawings, Figure 1 is a side elevation showing the application of my invention to the fork of a bicycle, a portion of the bell being broken away; Fig. 2, a plan view of the device removed; Fig. 3, an end elevation with the bell in section; Fig. 4, a section on the line $x\ x$ of Fig. 2.

Similar reference-numerals in the several figures indicate similar parts.

1 indicates the supporting frame or plate, preferably curved to fit one side of the fork of a bicycle or similar vehicle, and with this curved portion coöperates a removable piece 2, secured by screws 3 or similar appliances and serving to attach the device to the fork at the side of the periphery of the wheel, the tire of which is indicated by 4.

5 indicates an arbor extending vertically through the forward extension of the plate 1 and having at its upper end a small pinion or gear 6 and at its lower end, beneath the extension of the plate 1, an arm 7, to which is pivoted at 8 a flying bell-striker 9, adapted, when the arbor 5 is rotated, to be thrown out and strike the bell 10, secured upon a post 11, attached to the support 1.

12 indicates a plate or support loosely journaled upon the arbor 5 above the plate 1, and mounted in the free end of this plate 12 is an arbor or spindle 13, having at its upper end a wheel 14, adapted to be brought in contact with the tire of a bicycle, and beneath said wheel is a pinion 15, meshing with the pinion 6 on the arbor 5.

16 indicates a spring connected at one end of said plate 12 and at the other to the bell-post, said spring operating to hold the plate 12 in the position shown in full lines and against the stop 17 when the bell is not being operated. Pivoted at 30 to an extension $1^{\times}$ of the plate 1 is a bifurcated operating-lever, one arm 20 of which engages the side of the plate 12, and the other arm 21 has connected to it an operating-cord 22, extending in proximity to one of the handles of a bicycle within convenient reach of the rider.

The operation of the device will now be understood. The normal position of the parts being indicated in full lines, when the rider wishes to sound the alarm it is only necessary to operate the arm 21 by means of the cord 22, or otherwise, to the position shown in dotted lines in Figs. 2 and 3, turning the plate 12 upon the arbor 5 as a center, this bringing the wheel 14 into engagement with the side of the tire, when it will be rotated rapidly, and the rapid rotation of the flying bell-striker caused by the pinions 15 and 6 sounding the alarm. Upon releasing the cord 22 the spring 16 will return the parts to normal position out of the way and retain them until it is again desired to operate the alarm. A suitable stop 25 may be provided if desired for limiting the movement of the movable plate toward the wheel.

The device, as constructed, is simple and cheap and may be made of very light material and few parts, thus adding little weight to the bicycle, and the feature of employing the arbor operating the bell-striker as the pivotal point simplifies the construction.

I claim as my invention—

1. The combination with the support, means for attaching it to a cycle-frame and the bell thereon, of the rotatable arbor journaled on the support, the bell-striker attached thereto, the plate pivoted loosely on the arbor, the wheel on said plate adapted to engage a cycle-tire, connections between said wheel and the arbor for rotating the latter, and the spring for actuating the plate in one direction, substantially as described.

2. The combination with the support, means for attaching it to a cycle-frame, and the bell thereon, of the arbor on the support, the bell-striker and pinion on the arbor, the plate pivoted on the arbor, the pinion and the attached wheel carried on the plate, and means for moving the movable plate on the arbor as a pivot, substantially as described.

3. The combination with the support, means for attaching it to a cycle-frame and the bell thereon, of the rotatable arbor on the support, and the bell-striker connected thereto, the movable plate pivoted loosely at one end on the arbor and having the wheel at its free end, connections between the wheel and the arbor for rotating the latter, the spring for actuating the plate in one direction on the arbor, and the lever pivoted on the support and operating the plate against the tension of the spring, substantially as described.

4. The combination with the support 1, post 11 on the support and bell 10 thereon, of the arbor 5 journaled on the support, the striker 9, and gear 6 connected to the arbor, the plate 12 journaled on the arbor 5, the arbor 13 on said plate having the wheel 14 and gear 15, spring 16 and lever 20 arranged and operating substantially as described.

CHARLES H. ALLEN.

Witnesses:
G. A. RODA,
F. A. SMYTH.